(12) United States Patent
Komazawa et al.

(10) Patent No.: US 11,186,103 B2
(45) Date of Patent: Nov. 30, 2021

(54) PRINTING MANAGEMENT APPARATUS

(71) Applicant: FUJIFILM Business Innovation Corp., Tokyo (JP)

(72) Inventors: Hisao Komazawa, Kanagawa (JP); Kentaro Ikeda, Kanagawa (JP); Kodai Suzuki, Kanagawa (JP); Takashi Betsuyaku, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/589,107

(22) Filed: Sep. 30, 2019

(65) Prior Publication Data

US 2020/0406643 A1 Dec. 31, 2020

(30) Foreign Application Priority Data

Jun. 28, 2019 (JP) .............................. JP2019-122266

(51) Int. Cl.
  *B41J 13/00* (2006.01)
(52) U.S. Cl.
  CPC ................................ *B41J 13/0009* (2013.01)
(58) Field of Classification Search
  CPC ...... B41J 11/42; B41J 13/0009; G03G 15/652
  See application file for complete search history.

(56) References Cited

U.S. PATENT DOCUMENTS 10,025,249 B2  7/2018  Noda
2015/0338810 A1*  11/2015  Matsui ................ G03G 15/652
                                                        399/16

FOREIGN PATENT DOCUMENTS

| JP | 2004262070 | 9/2004 |
| JP | 2005219333 | 8/2005 |
| JP | 2010014935 | 1/2010 |
| JP | 5770580 | 8/2015 |
| JP | 2017207597 | 11/2017 |

* cited by examiner

*Primary Examiner* — Lam S Nguyen
(74) *Attorney, Agent, or Firm* — JCIPRNET

(57) ABSTRACT

A printing management apparatus includes a memory; and a processor that is connected to the memory, in which, in a case where a printing apparatus, which performs printing on continuous form paper, processes plural jobs with respect to the continuous form paper in one-time printing, the processor calculates a length, which is acquired by excluding a part used to print the plural jobs from a length determined by a transport start spot, at which transport of the continuous form paper starts and a transport end spot at which the transport of the continuous form paper ends, as an amount of waste paper indicative of a part which becomes a loss of the continuous form paper, and outputs an amount of waste paper for each job of plurality of jobs, which is acquired by allocating the calculated amount of waste paper to the plural jobs.

17 Claims, 17 Drawing Sheets

FIG. 6

| JOB HISTORY | | | | | | |
|---|---|---|---|---|---|---|
| TARGET PERIOD | DESIGNATE START/END PERIOD | | | | > | ↻ DISPLAY OF LIST |
| | START DATE | 06/10/2019 | | 0:00 | | |
| | END DATE | 06/10/2019 | | 23:59 | | |
| ⚙ SETTING OF ITEM... | | | 🖶 PRINT... | | | |
| RECORD DATE | ID | SUB ID | JOB NAME | | PRINTING (m) | SPOILED PAPER (m) |
| 06/10/2019 11:55:19 | 1 | | JOB A | | 90 | 9.7 |
| 06/10/2019 11:55:34 | 2 | | JOB B | | 90 | 0 |
| 06/10/2019 11:55:50 | 3 | | JOB C | | 120 | 5.3 |
| SUM | | | | | 300 | 15 |
| 1/1 DISPLAY: 1-3 (OF 3) | | | | | | CLOSE (C) |

FIG. 7

JOB HISTORY

TARGET PERIOD: DESIGNATE START/END PERIOD ∨

START DATE: 06/10/2019  0:00
END DATE: 06/10/2019  23:59

⚙ SETTING OF ITEM...    🖶 PRINT...    ↻ DISPLAY OF LIST

| RECORD DATE | ID | SUB ID | JOB NAME | PRINTING (m) | SPOILED PAPER (m) |
|---|---|---|---|---|---|
| 06/10/2019 11:55:19 | 1 | | JOB A | 90 | 5 |
| 06/10/2019 11:55:34 | 2 | | JOB B | 90 | 5 |
| 06/10/2019 11:55:50 | 3 | | JOB C | 120 | 5 |
| SUM | | | | 300 | 15 |

1/1  DISPLAY: 1-3 (OF 3)

CLOSE (C)

FIG. 8

| | | | | | | PRINTING (m) | SPOILED PAPER (m) |
|---|---|---|---|---|---|---|---|
| JOB HISTORY | | | | | | | |
| TARGET PERIOD | DESIGNATE START/END PERIOD | | | | | | |
| | START DATE | 06/10/2019 | | 0:00 | | | |
| | END DATE | 06/10/2019 | | 23:59 | | | |
| | SETTING OF ITEM... | | PRINT... | | | | |
| RECORD DATE | | ID | SUB ID | JOB NAME | | PRINTING (m) | SPOILED PAPER (m) |
| 06/10/2019 11:55:19 | | 1 | | JOB A | | 90 | 7.5 |
| 06/10/2019 11:55:34 | | 2 | | JOB B | | 90 | 4.5 |
| 06/10/2019 11:55:50 | | 3 | | JOB C | | 120 | 3 |
| SUM | | | | | | 300 | 15 |

1/1 DISPLAY: 1-3 (OF 3)

DISPLAY OF LIST

CLOSE (C)

FIG. 16

PRINTING MANAGEMENT APPARATUS

CROSS-REFERENCE TO RELATED APPLICATIONS

This application is based on and claims priority under 35 USC 119 from Japanese Patent Application No. 2019-122266 filed Jun. 28, 2019.

BACKGROUND

(i) Technical Field

The present invention relates to a printing management apparatus.

(ii) Related Art

For example, JP5770580B discloses a printing sequence determination apparatus which determines a printing sequence of a plurality of printing jobs with respect to printing paper in one unit in a printing system which includes a plurality of print settings or a plurality of post-processing settings. The printing sequence determination apparatus includes a waste paper amount storage unit that previously stores the amount of waste paper generated in a case where each print setting is changed into another print setting, or a waste paper amount corresponding to the amount of waste paper generated in a case where each post-processing setting is changed to another post-processing setting, and an input data storage unit that stores a plurality of input data including a printing paper type, a print specification, a post-processing specification, and print image data, respectively. In addition, the printing sequence determination apparatus includes an arithmetic unit that determines the printing sequence of the plurality of printing jobs generated from a plurality of pieces of paper-common input data by performing a) a process for acquiring the waste paper amount from the waste paper amount storage unit, for the plurality of pieces of paper-common input data, in which the printing paper type is common, among a plurality of input data, based on the print setting of the printing system corresponding to print specifications for respective two pieces of sequent paper-common input data or post-processing specifications for the respective two pieces of sequent paper-common input data, b) a process for acquiring a total waste paper amount which is a total of the waste paper amounts in the plurality of pieces of paper-common input data, and c) a process for acquiring the printing sequence, in which the total waste paper amount is the smallest, by performing the process of a) and the process of b) for a plurality of printing sequences of the plurality pieces of paper-common input data.

In addition, JP2017-207597A discloses an image forming apparatus which provides information relevant to a schedule of continuous form paper in accordance with execution of a job. The image forming apparatus includes a transport unit that transports the continuous form paper, an image forming unit that forms an image on the continuous form paper which is transported by the transport unit, a job selection unit which selects the job which is an execution target, and a control unit that calculates an image forming distance which is a length required for execution of the selected job in a transport direction of the continuous form paper and that displays the calculated image forming distance on a display unit.

SUMMARY

However, in order to guarantee printing at a stable image quality, a printing apparatus which performs the printing on continuous form paper, such as rolled paper, starts the printing of a job after waiting until a transport speed of the continuous form paper reaches a prescribed speed in a case where the printing starts. Therefore, apart (hereinafter, referred to as a "waste paper"), which becomes a loss without being used for the printing, is generated in the continuous form paper. In addition, even in a case where the printing stops, the continuous form paper is transported, after a stop instruction is provided, by a prescribed distance due to inertia. Therefore, the waste paper is generated in the same manner. That is, in the printing apparatus which uses the continuous form paper, structurally, the waste paper is generated before and after the printing.

In a printing company or the like, for cost management, a work person in charge calculates the amount of waste paper per one-time printing by excluding a paper length used for actual job printing from an entire length of the continuous form paper. In addition, in order to reduce the amount of waste paper, there is a case where a plurality of jobs are continuously processed in the one-time printing. In this case, in the printing company or the like, it is demanded to perform the cost management with respect to a received job for each job. However, the extent of generation of the waste paper is not grasped in job units.

Aspects of non-limiting embodiments of the present disclosure relate to a printing management apparatus which is capable of grasping the amount of waste paper to be generated in job units in a case where the printing is performed on the continuous form paper.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing management apparatus including: a memory; and a processor that is connected to the memory, in which, in a case where a printing apparatus, which performs printing on continuous form paper, processes a plurality of jobs with respect to the continuous form paper in one-time printing, the processor calculates a length, which is acquired by excluding a part used to print the plurality of jobs from a length determined by a transport start spot at which transport of the continuous form paper starts and a transport end spot, corresponding to a spot at which the transport of the continuous form paper ends, as an amount of waste paper indicative of a part which becomes a loss of the continuous form paper, and outputs an amount of waste paper for each job of the plurality of jobs, which is acquired by allocating the calculated amount of waste paper to the plurality of jobs.

BRIEF DESCRIPTION OF THE DRAWINGS

Exemplary embodiment(s) of the present invention will be described in detail based on the following figures, wherein:

FIG. 6 is a front diagram illustrating an example of a job history screen according to the exemplary embodiment;

FIG. 7 is a front diagram illustrating another example of the job history screen according to the exemplary embodiment;

FIG. 8 is a front diagram illustrating a further another example of the job history screen according to the exemplary embodiment;

FIG. 16 is a front diagram illustrating an example of a job history screen and a printing history screen according to the exemplary embodiment.

DETAILED DESCRIPTION

Hereinafter, exemplary embodiments of the present invention will be described in detail with reference to the accompanying drawings.

First Exemplary Embodiment

Figure 1:
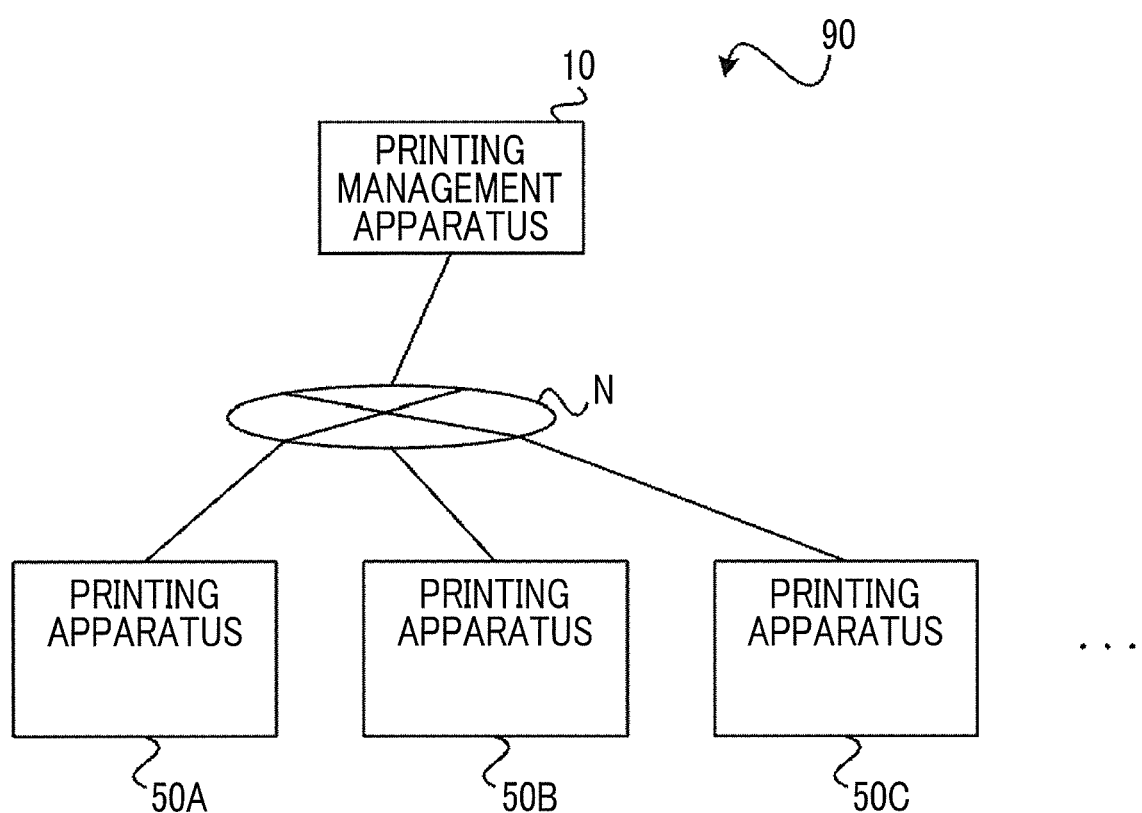
FIG. 1 is a diagram illustrating an example of a configuration of a printing management system according to a first exemplary embodiment.

FIG. 1 is a diagram illustrating an example of a configuration of a printing management system 90 according to a first exemplary embodiment.

As illustrated in FIG. 1, the printing management system 90 according to the exemplary embodiment includes a printing management apparatus 10 and a plurality of printing apparatuses 50A, 50B, 50C, . . . .

The printing management apparatus 10 is connected to each of the plurality of printing apparatuses 50A, 50B, 50C, . . . through a network N. As an example, the Internet, a Local Area Network (LAN), a Wide Area Network (WAN), and the like are applied to the network N. Although the plurality of printing apparatuses 50A, 50B, 50C, . . . are illustrated in the example of FIG. 1, the exemplary embodiment is applied in the same manner even in a case of one printing apparatus. In addition, in a case where it is not necessary to separately describe the plurality of printing apparatuses 50A, 50B, 50C, . . . , the plurality of printing apparatuses 50A, 50B, 50C, . . . are collectively referred to as a printing apparatus 50.

The printing apparatus 50 is a so-called book-sheeting printer which performs printing on continuous form paper such as rolled paper. Although the printing management apparatus 10 and the printing apparatus 50 are formed as separated parts in the exemplary embodiment, the printing management apparatus 10 and the printing apparatus 50 may be integrally formed.

The printing management apparatus 10 receives various pieces of information relevant to an work from the printing apparatus 50, manages a work situation and throughput of the printing apparatus 50, and transmits various instructions, such as an work instruction of the printing apparatus 50, a stop instruction, and setting instruction to set an operation of the printing apparatus 50 to the printing apparatus 50.

There is a case where the printing management system 90 includes, for example, a processing apparatus, a post-processing apparatus, a cutting apparatus, and the like in addition to the printing management apparatus 10 and the printing apparatus 50. Each of the processing apparatus, the post-processing apparatus, and the cutting apparatus is connected to the network N such that a work situation and throughput thereof are managed by the printing management apparatus 10, and performs a process according to an instruction from the printing management apparatus 10. In the exemplary embodiment, description is performed while taking management of the printing apparatus 50 by the printing management apparatus 10 into consideration. Therefore, the processing apparatus, the post-processing apparatus, and the cutting apparatus are not illustrated in the drawing.

The processing apparatus is, for example, an apparatus which performs a processing for coating a varnish in order to suppress damage or dirt from being attached to a print side of a recording medium (hereinafter, referred to as a "sheet"), such as paper, on which printing is performed by the printing apparatus 50. The post-processing apparatus is, for example, an apparatus which performs a process for attaching a cover by binding sheets of text in a state of being folded to be arranged in page order and making a form of a book. The cutting apparatus is, for example, an apparatus which performs a process for cutting an unfilled space of the bound book and completing the book with a predetermined size.

Figure 2:
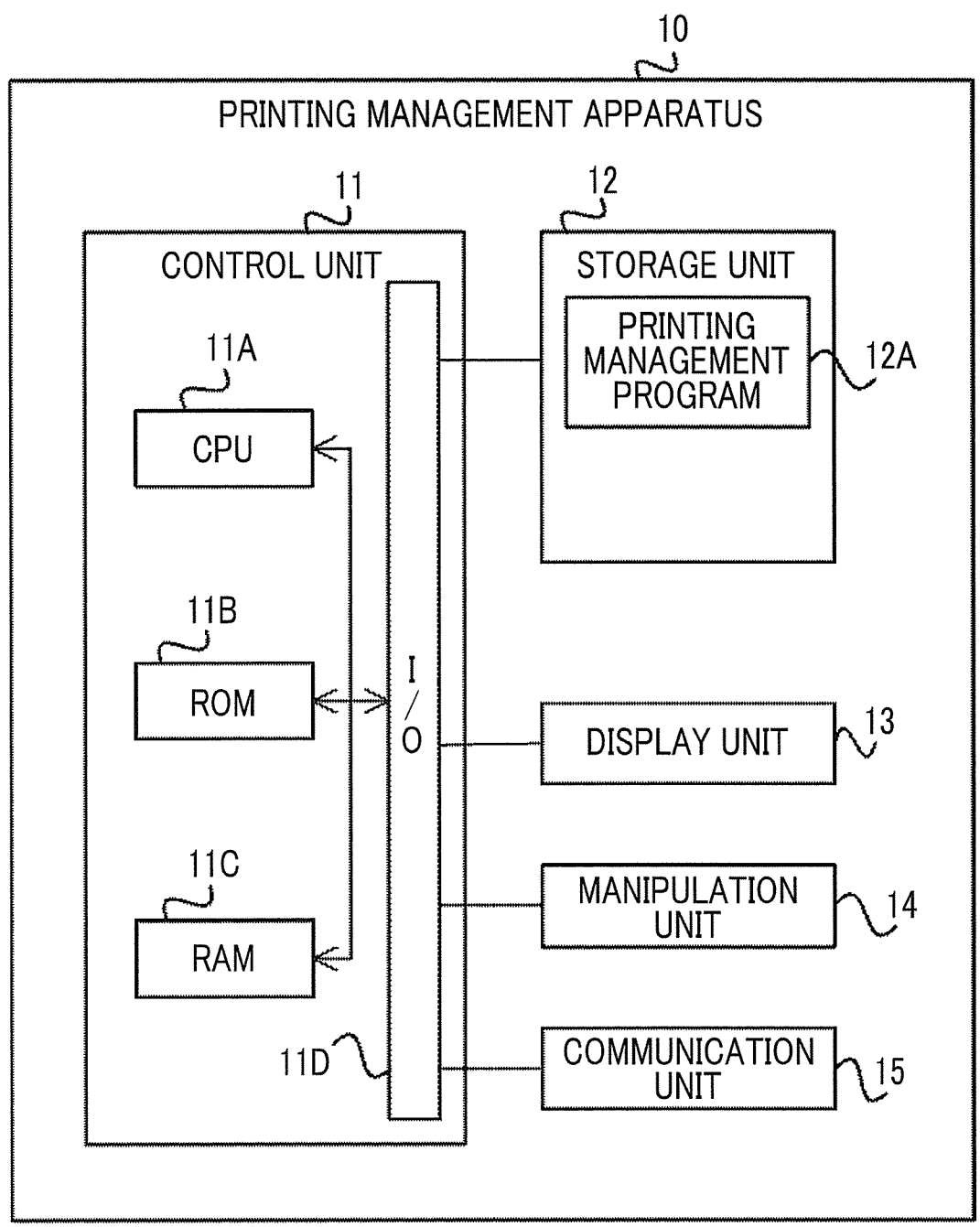
FIG. 2 is a block diagram illustrating an example of an electrical configuration of a printing management apparatus according to the first exemplary embodiment.

FIG. 2 is a block diagram illustrating an example of an electrical configuration of the printing management apparatus 10 according to the first exemplary embodiment.

As illustrated in FIG. 2, the printing management apparatus 10 according to the exemplary embodiment includes a control unit 11, a storage unit 12, a display unit 13, a manipulation unit 14, and a communication unit 15.

The control unit 11 includes a Central Processing Unit (CPU) 11A, a Read Only Memory (ROM) 11B, a Random Access Memory (RAM) 11C, and an input and output interface (I/O) 11D, and the respective units are connected respectively through a bus.

Respective functioning units, which include the storage unit 12, the display unit 13, the manipulation unit 14, and the communication unit 15, are connected to the I/O 11D. The respective functioning units are capable of mutually communicating with the CPU 11A through the I/O 11D.

The control unit 11 may be formed as a sub control unit which controls some operations of the printing management apparatus 10, or may be formed as a part of a main control unit which controls an operation of an entirety of the printing management apparatus 10. For example, an integrated circuit, such as a Large Scale Integration (LSI), or an Integrated Circuit (IC) chip set is used for some or the entirety of the respective blocks of the control unit 11. Individual circuits may be used for the respective blocks or a circuit, in which some or the entirety of the respective blocks are integrated, may be used. The respective blocks may be integrally provided, or some blocks may be separately provided. In addition, in each of the blocks, some of the blocks may be separately provided. While being not limited to the LSI, a dedicated circuit or a general-purpose processor may be used for integration of the control unit 11.

For example, a Hard Disk Drive (HDD), a Solid State Drive (SSD), a flash memory, or the like is used as the storage unit 12. A printing management program 12A for realizing a printing management function according to the exemplary embodiment is stored in the storage unit 12. The printing management program 12A may be stored in a ROM 11B.

The printing management program 12A may be previously installed, for example, in the printing management apparatus 10. The printing management program 12A may be realized by being stored in a non-volatile storage medium or being distributed through the network N and by being appropriately installed in the printing management apparatus 10. As an example of the non-volatile storage medium, a Compact Disc Read Only Memory (CD-ROM), a magneto-optical disk, the HDD, a Digital Versatile Disc Read Only Memory (DVD-ROM), a flash memory, a memory card, and the like are assumed.

For example, a Liquid Crystal Display (LCD), an organic Electro Luminescence (EL) display, and the like are used as the display unit 13. The display unit 13 may integrally include a touch panel. The manipulation unit 14 is provided with, for example, a manipulation input device such as a keyboard or a mouse. The display unit 13 and the manipulation unit 14 receive various instructions from a user of the printing management apparatus 10. The display unit 13 displays various pieces of information such as results of a process performed according to the instructions received from the user or notifications with respect to the process.

The communication unit 15 is connected to the network N such as the Internet, the LAN, or the WAN, and is capable of performing communication with the printing apparatus 50 through the network N. The communication performed through the network N may be wired communication or wireless communication.

As described above, it is demanded for a printing company or the like to perform cost management with respect to a received job for each job. However, the extent of waste paper generated in units of the job is not grasped.

Therefore, the CPU 11A of the printing management apparatus 10 according to the exemplary embodiment functions as below by writing and executing the printing management program 12A, which is stored in the storage unit 12, in the RAM 11C. The CPU 11A is an example of a processor.

In a case where the printing apparatus 50 processes a plurality of jobs with respect to the continuous form paper in one-time printing, the CPU 11A acquires a transport start spot and a transport end spot. The transport start spot is a spot at which transport of the continuous form paper starts, and the transport end spot is a spot at which the transport of the continuous form paper ends. Here, the spot is indicated by a distance from the transport start spot in a case where the transport start spot is set to reference (=0). In addition, here, the job indicates a print processing unit. For example, one job indicates printing data used in a case where one file is printed. The number of pages included in one file is a random number which is equal to or larger than 1. That is, one file corresponding to one job may include, for example, one page, or may include 1000 pages. The number of pages included in one file may be previously set or may be appropriately set by the user.

The CPU 11A calculates a length, which is acquired by excluding a part used to print the plurality of jobs from a length determined by the acquired transport start spot and the transport end spot, as the amount of waste paper. As described above, the waste paper indicates a part, which is not used for the printing and becomes the loss, of the continuous form paper, and is also referred to as spoiled paper. Since the amount of waste paper changes according to a job printing condition (for example, a color, monochrome, a printing speed, existence/non-existence of the post-processing, or the like), the amount of waste paper is not uniform for each job. The waste paper includes a part between the transport start spot and a spot, at which printing of a leading page of an initial job of the plurality of jobs starts, and a part between a spot, at which printing of a final page of the last job of the plurality of jobs ends, and the transport end spot.

The CPU 11A outputs the amount of waste paper for each job, which is acquired by allocating the calculated amount of waste paper to each of the plurality of jobs. An output destination of the amount of waste paper for each job may be the display unit 13 or the storage unit 12. A method for allocating the calculated amount of waste paper includes, for example, (1) a method for performing proportional division according to the number of pages of each of the plurality of jobs included in an one-time printing process, (2) a method for performing equal division for each of the plurality of jobs included in the one-time printing process, and (3) a method for allocating a waste paper before the printing starts to the initial job, allocating a waste paper after the printing ends to the last job, and allocating none to the waste paper to an intermediate job (waste paper=0). An appropriate method may be used according to which cost management is desired for the user to perform. Even in a case where one job is processed in the one-time printing, the waste paper is generated before the printing starts and after the printing starts, respectively. Therefore, there may be a method for allocating the waste paper before the printing starts and the waste paper after the printing ends with respect to each of the plurality of jobs.

Subsequently, a process for calculating the amount of waste paper from continuous form paper P (hereinafter, referred to as a "waste paper aggregating process") will be described in detail with reference to FIG. 3.

Figure 3:
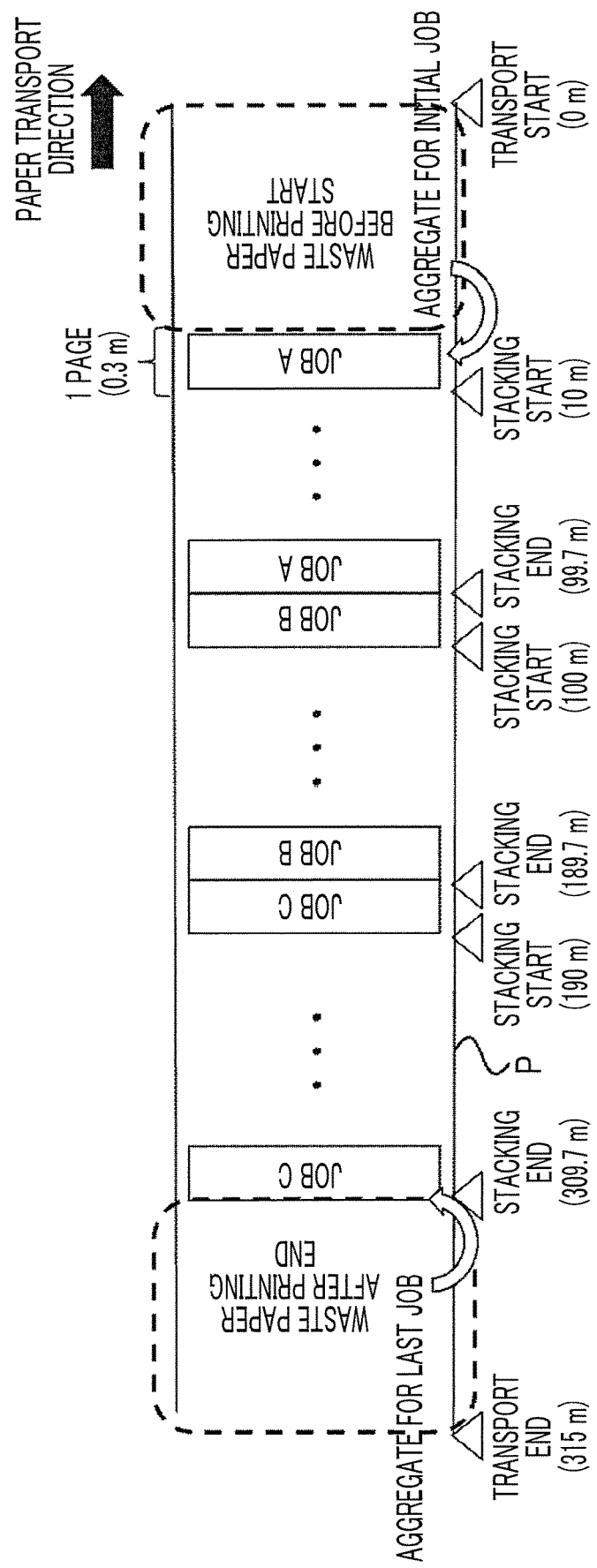
FIG. 3 is a diagram providing explanation of a waste paper aggregating process according to the first exemplary embodiment.

FIG. 3 is a diagram providing explanation of the waste paper aggregating process according to the first exemplary embodiment.

The printing apparatus 50 is provided with a paper counter (not illustrated in the drawing). In a case where the continuous form paper P is transported toward a paper transport direction indicated by a black arrow, a distance from the transport start spot is measured using the transport start spot as the reference (a count value of the paper counter=0 m). Numbers in parentheses of FIG. 3 indicates the count values.

In the example illustrated in FIG. 3, three jobs, that is, a job A, a job B, and a job C are processed as examples of the plurality of jobs in the one-time printing. For simplicity of description, a length (12 inch≅0.3 m in the example of FIG. 3) of each job per one page is set to the same value.

In a case where the transport of the continuous form paper P starts, the printing apparatus 50 sets a spot, at which a leading page of the job A corresponding to the initial job is completely stacked, to a stacking start spot, and notifies the count value (10 m in the example of FIG. 3) of the paper counter at the stacking start spot to the printing management apparatus 10. Subsequently, the printing apparatus 50 sets a spot, at which a final page of the job A is completely stacked, to a stacking end spot, and notifies the count value (99.7 m in the example of FIG. 3) of the paper counter at the stacking end spot to the printing management apparatus 10. Hereinafter, in the same manner, the printing apparatus 50 notifies, for the job B, a count value (100 m in the example of FIG. 3) at the stacking start spot of the leading page and a count value (189.7 m in the example of FIG. 3) at the stacking end spot of the final page to the printing management apparatus 10. The printing apparatus 50 notifies, for the job C corresponding to the last job, the count value (190 m in the example of FIG. 3) at the stacking start spot of the leading page and the count value (309.7 m in the example of FIG. 3) at the stacking end spot of the final page to the printing management apparatus 10. Furthermore, the printing apparatus 50 notifies a count value (315 m in the example of FIG. 3) at a transport end spot of the continuous form paper P to the printing management apparatus 10.

In a case where the respective counts values of the stacking start spot and the stacking end spot of the job are notified, it is guaranteed that the printing is securely completed.

The CPU 11A of the printing management apparatus 10 aggregates a length (15 m in the example of FIG. 3), which is acquired by subtracting a length (300 m in the example of FIG. 3) of a part, which is used to print the jobs A to C, from the length (315 m in the example of FIG. 3) determined by the transport start spot and the transport end spot, as the amount of waste paper, based on the respective count values acquired from the printing apparatus 50. At this time, as content of the amount of waste paper, the amount of waste paper before the printing starts (9.7 m in the example of FIG. 3) and the amount of waste paper after the printing ends (5.3 m in the example of FIG. 3) are acquired. In addition, a printing length (90 m in the example of FIG. 3) of the job A, a printing length (90 m in the example of FIG. 3) of the job B, and a printing length (120 m in the example of FIG. 3) of the job C are acquired.

Furthermore, as an example, as being illustrated in FIGS. 6 to 8 which will be described later, the CPU 11A allocates the amount of aggregated waste paper to each of the jobs A to C, and outputs the amount of waste paper for each job acquired through the allocation.

Subsequently, printing management, performed in a case where multiple-time printing is continuously performed, will be described.

In a case where the printing apparatus 50 processes a plurality of subsequent jobs continuing the plurality of jobs with respect to the continuous form paper in the one-time printing, the CPU 11A acquires a subsequent transport start spot corresponding to the same spot as the transport end spot and a subsequent transport end spot.

The CPU 11A calculates a length, acquired by excluding a part used to print the plurality of subsequent jobs from a length determined by the acquired subsequent transport start spot and the subsequent transport end spot, as the amount of subsequent waste paper. The waste paper includes the part between the transport start spot and the spot, at which the printing of the leading page of the initial job of the plurality of jobs starts, and a part between the spot, at which the printing of the final page of the last job of the plurality of jobs ends, and the transport end spot. In addition, the subsequent waste paper includes a part between the subsequent transport start spot and the spot, at which the printing of the leading page of the initial job of the plurality of subsequent jobs starts, and the part between the spot, at which the printing of the final page of the last job of the plurality of subsequent jobs ends, and the subsequent transport end spot.

The CPU 11A outputs the amount of waste paper for each job, which is acquired by allocating the calculated amount of waste paper to each of the plurality of jobs, and outputs the amount of subsequent waste paper for each subsequent job, which is acquired by allocating the calculated amount of subsequent waste paper to each of the plurality of subsequent jobs.

Subsequently, a waste paper aggregating process, which is performed in a case where multiple-time printing is continuously performed, will be described in detail with reference to FIG. 4.

Figure 4:
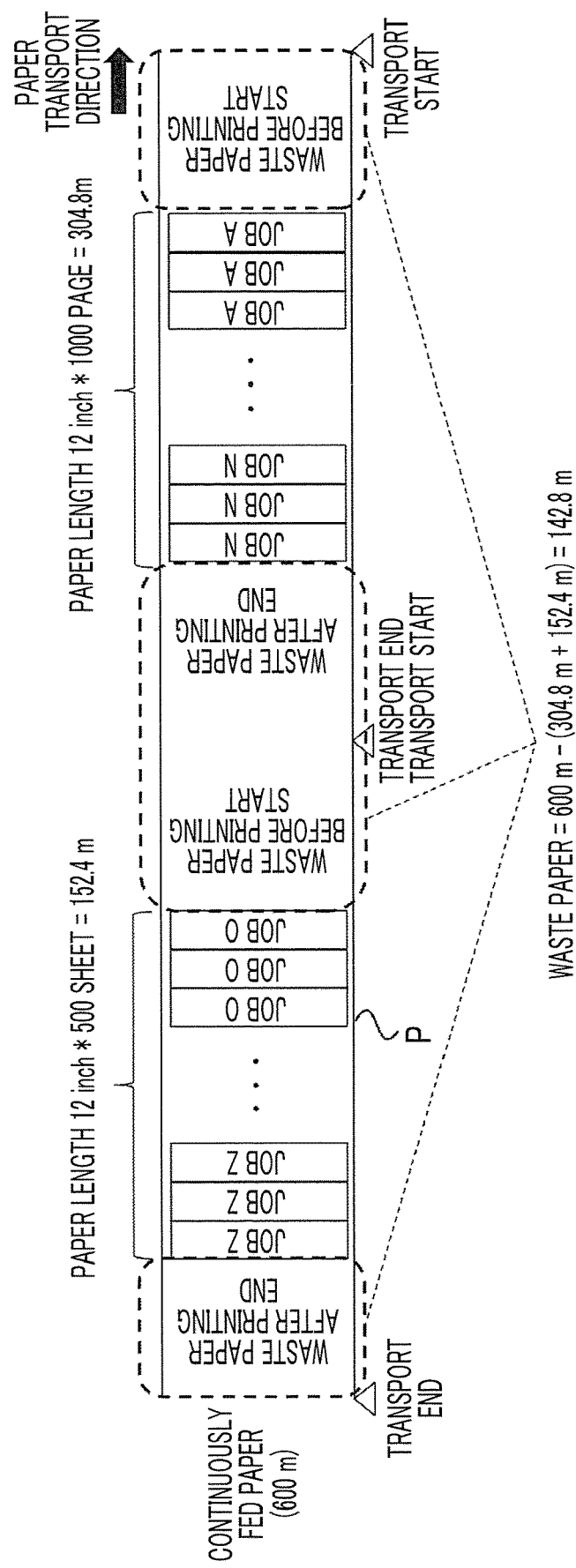
FIG. 4 is a diagram providing explanation of another waste paper aggregating process according to the first exemplary embodiment.

FIG. 4 is a diagram providing explanation of another waste paper aggregating process according to the first exemplary embodiment.

In an example illustrated in FIG. 4, in initial printing, jobs A to N are processed as examples of the plurality of jobs. Furthermore, in subsequent printing, jobs O to Z are processed as the examples of the plurality of jobs.

Similar to the above-described example of FIG. 3, the printing apparatus 50, for the initial printing, notifies a count value at the transport start spot and the count value at the transport end spot to the printing management apparatus 10. In addition, the printing apparatus 50, for the subsequent printing, notifies a count value at the subsequent transport start spot, which is the same as the transport end spot, and a count value at the subsequent transport end spot to the printing management apparatus 10.

The CPU 11A of the printing management apparatus 10 aggregates a length, which is acquired by subtracting a length of a part used to print the jobs A to N from the length determined by the transport start spot and the transport end spot, as the amount of waste paper, based on each of the count values, acquired from the printing apparatus 50. Similarly, the CPU 11A outputs a length, which is acquired by subtracting a length of a part used to print the jobs O to Z from a length determined by the subsequent transport start spot and the subsequent transport end spot, as the amount of subsequent waste paper, based on each of the count values for the subsequent printing acquired from the printing apparatus 50. In this case, a count value of the subsequent transport start spot may be reset.

Furthermore, the CPU 11A allocates the amount of waste paper aggregated for the initial printing to each of the jobs A to N, outputs the amount of waste paper for each job acquired through the allocation, allocates the amount of waste paper aggregated for the subsequent printing to each of the jobs O to Z, and outputs the amount of waste paper for each job acquired through the allocation.

That is, in the example of FIG. 4, a length (=142.8 m), which is acquired by subtracting a printing length (=304.8 m) used for the initial printing and a printing length (=152.4 m) used for the subsequent printing from an entire length (=600 m) of the continuous form paper, becomes the amount of waste paper. In the example of FIG. 4, the transport end spot for the initial printing and the subsequent transport start spot for the subsequent printing are respectively prescribed. Therefore, it is possible to allocate the waste paper before the printing starts and the waste paper after the printing ends with respect to each of the plurality of jobs processed in the initial printing, and to allocate the waste paper before the printing starts and the waste paper after the printing ends with respect to each of the plurality of jobs processed in the subsequent printing.

Subsequently, an operation of the printing management apparatus 10 according to the first exemplary embodiment will be described with reference to FIG. 5.

Figure 5:
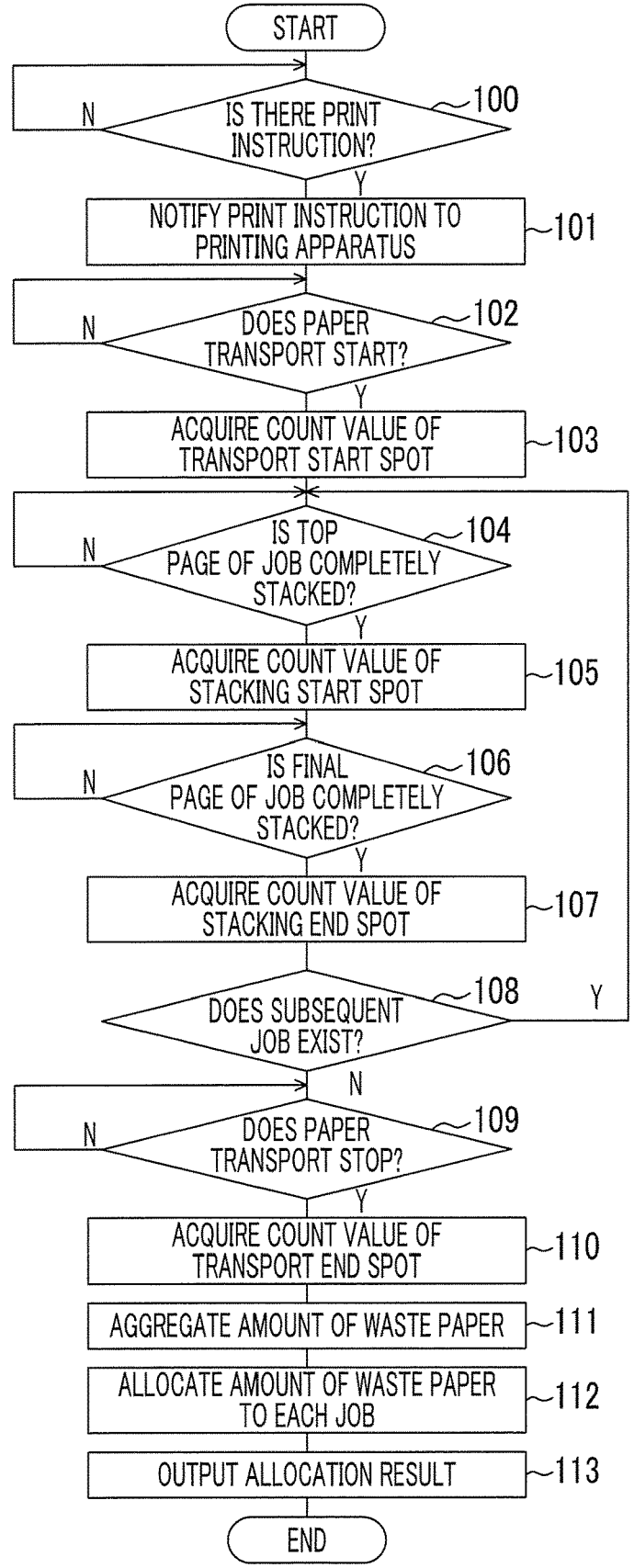
FIG. 5 is a flowchart illustrating an example of a flow of a process performed by a printing management program according to the first exemplary embodiment.

FIG. 5 is a flowchart illustrating an example of a flow of a process performed by the printing management program 12A according to the first exemplary embodiment.

First, in a case where power of the printing management apparatus 10 is turned on and the printing management apparatus 10 is driven, the printing management program 12A is driven, and the following respective steps are performed. In the exemplary embodiment, as an example, the continuous form paper P illustrated in FIG. 3 will be described as a target.

In step 100 of FIG. 5, the CPU 11A determines whether or not a print instruction to the printing apparatus 50 exists according to an operation of the user. In a case where it is determined that the print instruction exists (in a case of positive determination), the process proceeds to step 101. In a case where it is determined that the print instruction does not exist (in a case of negative determination), the process stands by in step 100.

In step 101, the CPU 11A notifies the print instruction to the printing apparatus 50, and starts to monitor the printing apparatus 50.

In step 102, the CPU 11A determines whether or not the transport of the continuous form paper P starts in the printing apparatus 50. In a case where it is determined that the transport of the continuous form paper P starts (in a case of positive determination), the process proceeds to step 103. In a case where it is determined that the transport of the continuous form paper P does not start (in a case of negative determination), the process stands by in step 102.

In step 103, the CPU 11A acquires a count value of a transport start spot of the continuous form paper P from the printing apparatus 50, and stores the acquired count value in the storage unit 12.

In step 104, the CPU 11A determines whether or not the leading page of the job A is completely stacked. In a case where it is determined that the leading page is completely stacked (in a case of positive determination), the process proceeds to step 105. In a case where it is determined that the leading page is not completely stacked (in a case of negative determination), the process stands by in step 104.

In step 105, the CPU 11A acquires a count value of a stacking start spot of the job A from the printing apparatus 50, and stores the acquired count value in the storage unit 12.

In step 106, the CPU 11A determines whether or not the final page of the job A is completely stacked. In a case where it is determined that the final page is completely stacked (in a case of positive determination), the process proceeds to step 107. In a case where it is determined that the final page is not completely stacked (in a case of negative determination), the process stands by in step 106.

In step 107, the CPU 11A acquires a count value of a stacking end spot of the job A from the printing apparatus 50, and stores the acquired count value in the storage unit 12.

In step 108, the CPU 11A determines whether or not a subsequent job exists. In a case where it is determined that the subsequent job exists (in a case of positive determination), the process returns to step 104 and the process is repeated. In a case where it is determined that the subsequent job does not exist (in a case of negative determination), the process proceeds to step 109. In the above-described example of FIG. 3, since the job B and the job C exist as the subsequent jobs, the positive determination is performed, and thus the processes in steps 104 to 108 are performed for the job B and the job C.

In step 109, the CPU 11A determines whether or not the transport of the continuous form paper P stops. In a case where it is determined that the transport of the continuous form paper P stops (in a case of positive determination), the process proceeds to step 110. In a case where it is determined that the transport of the continuous form paper P does not stop (in a case of negative determination), the process stands by in step 109.

In step 110, the CPU 11A acquires a count value of the spot, at which the transport of the continuous form paper P ends, from the printing apparatus 50, and stores the acquired count value in the storage unit 12.

In step 111, the CPU 11A aggregates the amount of waste paper based on the respective count values stored in the storage unit 12. Specifically, as described above, the length (15 m in the example of FIG. 3), which is acquired by subtracting the length (300 m in the example of FIG. 3) used to print the jobs A to C from the length (315 m in the example of FIG. 3) determined by the transport start spot and the transport end spot, is aggregated as the amount of waste paper.

In step 112, the CPU 11A allocates the amount of waste paper aggregated in step 111 to each job. Specifically, as described above, for example, (1) a method for performing proportionally division according to the number of pages of each of the jobs A to C, (2) a method for performing equal division for each job including the jobs A to C, (3) a method for allocating the waste paper before the printing starts to the job A, allocating the waste paper after the printing ends to the job C, and allocating none to the job B (waste paper=0), and the like are used.

In step 113, as an example, the CPU 11A outputs allocation results, acquired through allocation performed in step 112, to the display unit 13, as illustrated in FIGS. 6 to 8, and ends a series of processes performed by the printing management program 12A.

FIG. 6 is a front diagram illustrating an example of a job history screen according to the exemplary embodiment.

In the job history screen illustrated in FIG. 6, a printing length and a spoiled paper length (that is, a waste paper length) are displayed for each of the jobs A to C. The example of FIG. 6 illustrates the method of (3), that is, a case of allocating the spoiled paper length (=9.7 m) before the printing starts to the job A, allocating the spoiled paper length (=5.3 m) after the printing ends to the job C, and allocating none to the job B (spoiled paper length=0).

FIG. 7 is a front diagram illustrating another example of the job history screen according to the exemplary embodiment.

The example of FIG. 7 illustrates the method of (2), that is, a case of performing equal division on the spoiled paper length (=15 m) per one-time printing into three parts, that is, the jobs A to C, and allocating 5 m to the job A, 5 m to the job B and 5 m to the job C, respectively.

FIG. 8 is a front diagram illustrating a further another example of the job history screen according to the exemplary embodiment.

The example of FIG. 8 illustrates the method of (1), that is, a case of proportionally dividing the spoiled paper length (=15 m) per one-time printing according to the number of pages of each of the jobs A to C, and allocating 7.5 m to the job A, 4.5 m to the job B, and 3 m to the job C, respectively. The job A is set to 500 pages, the job B is set to 300 pages, and the job C is set to 200 pages, and distribution is performed at a ratio of 5:3:2.

In the first exemplary embodiment, a form, in which the amount of waste paper is grasped for each job in a case where the printing of the plurality of jobs is normally performed, is described. In the exemplary embodiment, a form, in which the amount of waste paper is grasped for each job in a case where an error occurs during the printing of the plurality of jobs, will be described.

An electrical configuration of a printing management apparatus according to the exemplary embodiment is the same as the printing management apparatus 10 according to the first exemplary embodiment. Therefore, the CPU 11A (refer to FIG. 2) of the printing management apparatus 10 according to the exemplary embodiment functions as below by writing and executing the printing management program 12A in the RAM 11C stored in the storage unit 12.

The CPU 11A once stops the printing of the plurality of jobs according to the error generated during the printing of the plurality of jobs. Thereafter, in a case where the printing restarts from a page on which the error occurs, the CPU 11A acquires the transport start spot of the continuous form paper before the error occurs and the transport end spot of the continuous form paper after the printing restarts.

The CPU 11A calculates the length, which is acquired by excluding the part used to print the plurality of jobs from the length determined by the acquired transport start spot and the transport end spot, as the amount of waste paper. Here, the waste paper includes the part between the transport start spot and the spot, at which the leading page of the initial job of the plurality of jobs starts, a part between a spot, at which the printing of a page immediately before the error occurs stops, and the transport stop spot corresponding to a spot, at which the transport of the continuous form paper stops due to occurrence of the error, a part between a transport restart spot corresponding to the same spot as the transport stop spot and a spot, at which the printing restarts with respect to the continuous form paper, and the part between the spot, at which the final page of the last job of the plurality of jobs ends, and the transport end spot.

The CPU 11A outputs the amount of waste paper for each job, which is acquired by allocating the calculated amount of waste paper to each of the plurality of jobs. A method for allocating the calculated amount of waste paper includes, for example, (1) a method for performing proportional division according to the number of pages of each of the plurality of jobs included in the one-time printing process, (2) a method for performing the equal division on each job of the plurality of jobs included in the one-time printing process, and the like.

The method for allocating the calculated amount of waste paper may be changed between a case where the error occurs and a case where the no error occurs. Specifically, for example, in the case where no error occurs during the printing of the plurality of jobs, the calculated amount of waste paper is allocated according to the length of the part used to print each of the plurality of jobs. In contrast, in the case where the error occurs during the printing of the plurality of jobs, the amount of waste paper generated due to the occurrence of the error is allocated to a job in which the error occurs, that is, the amount of waste paper, which includes the part between the transport start spot and the spot, at which the printing of the leading page of the initial job of the plurality of jobs starts, and the part between the spot, at which the printing of the final page of the last job of the plurality of jobs ends, and the transport end spot, is allocated according to the length of the part used to print each of the plurality of jobs. In addition, in the one-time printing process, the waste paper before the printing starts may be allocated to the initial job, the waste paper after the printing ends may be allocated to the last job, and the waste paper generated due to the occurrence of the error may be allocated to the job during the printing in a case where the error occurs.

Subsequently, the waste paper aggregating process, performed in a case where the printing restarts from an error generated page, will be described in detail with reference to FIG. 9.

Figure 9:
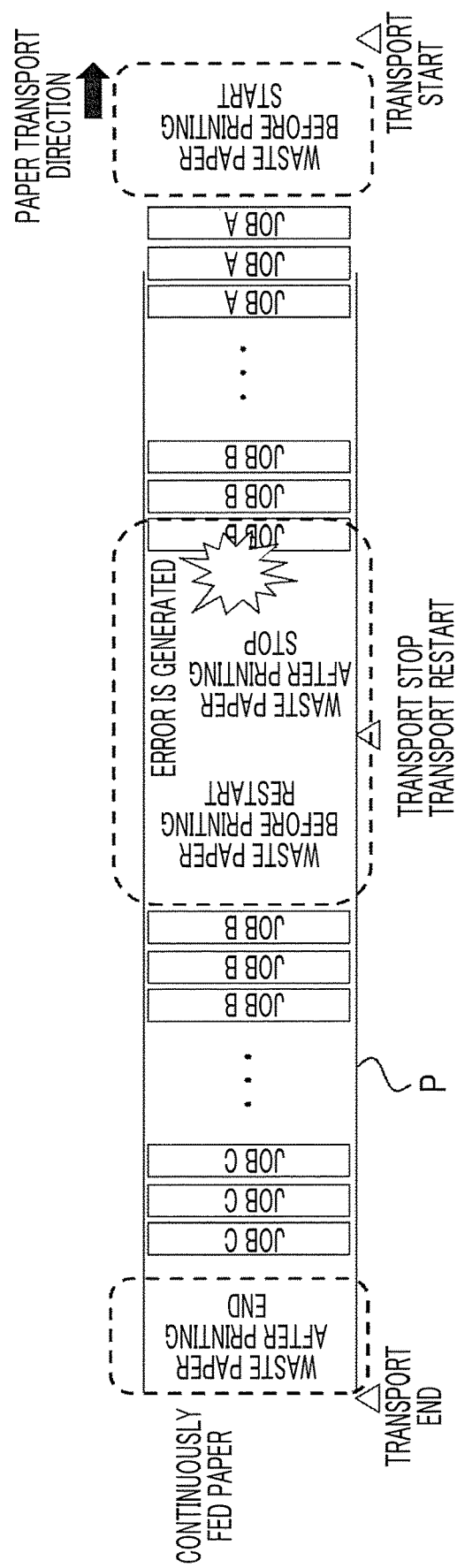
FIG. 9 is a diagram providing explanation of a waste paper aggregating process according to a second exemplary embodiment.

FIG. 9 is a diagram providing explanation of a wastepaper aggregating process according to the second exemplary embodiment.

As described above, the printing apparatus 50 is provided with the paper counter (not illustrated in the drawing). In a case where the continuous form paper P is transported in the paper transport direction indicated by the black arrow, the distance from the transport start spot is measured using the transport start spot as the reference (a count value of the paper counter=0 m).

In an example illustrated in FIG. 9, as examples of the plurality of jobs, three jobs, that is, the job A, the job B, and the job C are processed in the one-time printing.

In a case where the occurrence of the error is detected, the printing apparatus 50 notifies, for example, a count value at a stacking end spot of a page, which is stacked immediately before the occurrence of the error, of the job B processed in the case where the error occurs, and a count value at the transport stop spot, at which the transport of the continuous form paper P stops due to the occurrence of the error, to the printing management apparatus 10. Subsequently, the printing apparatus 50 notifies a count value of the transport restart spot corresponding to the same spot as the transport stop spot, and a count value of a spot, at which the printing is restarted with respect to the continuous form paper P, that is, a count value of a stacking restart spot of a printing-restart page, to the printing management apparatus 10. Furthermore, the printing apparatus 50 notifies a count value of a spot, at which the printing of the final page of the job C which is the last job ends, that is, the stacking end spot of the final page, and the count value of the spot, at which the transport of the continuous form paper P ends, to the printing management apparatus 10.

The CPU 11A of the printing management apparatus 10 aggregates a length, which is acquired by subtracting the length of the part used to print the jobs A to C from the length determined by the transport start spot and the transport end spot, as the amount of waste paper, based on each count value acquired from the printing apparatus 50. At this time, as the content of the amount of waste paper, the amount of waste paper before the printing starts, the amount of waste paper after the printing stops according to the occurrence of the error, the amount of waste paper before the printing restarts according to the occurrence of the error, and the amount of waste paper after the printing starts are acquired.

The CPU 11A allocates, for example, the amount of waste paper before the printing starts to the job A, allocates the amount of waste paper generated due to the occurrence of the error to the job B during the printing in the case where the error occurs, and allocates the amount of waste paper after the printing starts to the job C. The amount of waste paper generated due to the occurrence of the error includes the amount of waste paper acquired until the transport stops after the printing stops, and the amount of waste paper until the printing restarts after the transport restarts.

Subsequently, the printing management, which is performed in a case where the printing restarts from a page preceding the error generated page, will be described.

In this case, in the case where the printing restarts from the page preceding the page on which the error occurs after once stopping the printing of the plurality of jobs according to the error generated during the printing of the plurality of jobs, the CPU 11A acquires the transport start spot of the continuous form paper before the error occurs and the transport end spot of the continuous form paper after the printing restarts.

The CPU 11A calculates a length, which is acquired by adding a length of a part duplicately printed due to the occurrence of the error to the length acquired by excluding the part used to print the plurality of jobs from the length determined by the acquired transport start spot and the transport end spot, as the amount of waste paper. Here, the waste paper includes the part between the transport start spot and the spot, at which the printing of the leading page of the initial job of the plurality of jobs starts, the part between a spot, at which the printing of the page immediately before the error occurs stops, and the transport stop spot corresponding to a spot at which the transport of the continuous form paper stops due to the occurrence of the error, a part between the transport restart spot corresponding to the same spot as the transport stop spot and the spot at which the printing restarts with respect to the continuous form paper, the part between the spot, at which the final page of the last job of the plurality of jobs ends, and the transport end spot, and the part duplicately printed due to the occurrence of the error.

The CPU 11A outputs the amount of waste paper for each job, which is acquired by allocating the calculated amount of waste paper to each of the plurality of jobs. Here, the part duplicately printed due to the occurrence of the error is counted as the waste paper. In this case, the amount of waste paper generated due to the occurrence of the error and the amount of waste paper duplicately printed due to the occurrence of the error may be allocated to the job during the printing in the case where the error occurs. The amount of waste paper, which includes the part between the transport start spot and the spot, at which the printing of the leading page of the initial job of the plurality of jobs starts, and the part between the spot, at which the final page of the last job of the plurality of jobs ends, and the transport end spot, is allocated according to, for example, the length of the part used to print each of the plurality of jobs.

Subsequently, the waste paper aggregating process, which is performed in a case where the printing restarts from the page preceding the error generated page, will be described in detail with reference to FIG. 10.

Figure 10:
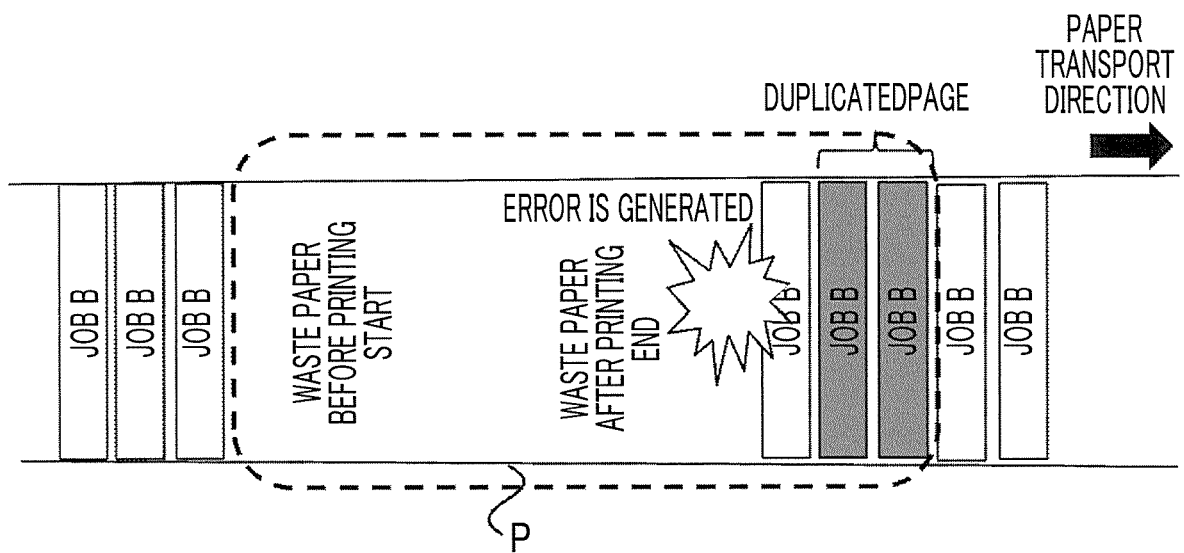
FIG. 10 is a diagram providing explanation of another waste paper aggregating process according to the second exemplary embodiment.

FIG. 10 is a diagram providing explanation of another waste paper aggregating process according to the second exemplary embodiment.

An example illustrated in FIG. 10 illustrates a case where the printing restarts from the page preceding the page, on which the error occurs, of the job B which is processed in the case where the error occurs. That is, in a case where the printing-restarted page returns to a page preceding a completely printed page, apart of the duplicately printed page is counted as the waste paper.

Subsequently, the waste paper aggregating process according to the exemplary embodiment will be described in further detail with reference to FIGS. 11 to 13. For simplicity of description, a case where a length of each job per one page is set to 12 inch≅0.3 m and a job of 500 pages is processed in the one-time printing is illustrated in examples of FIGS. 11 to 13.

Figure 11:
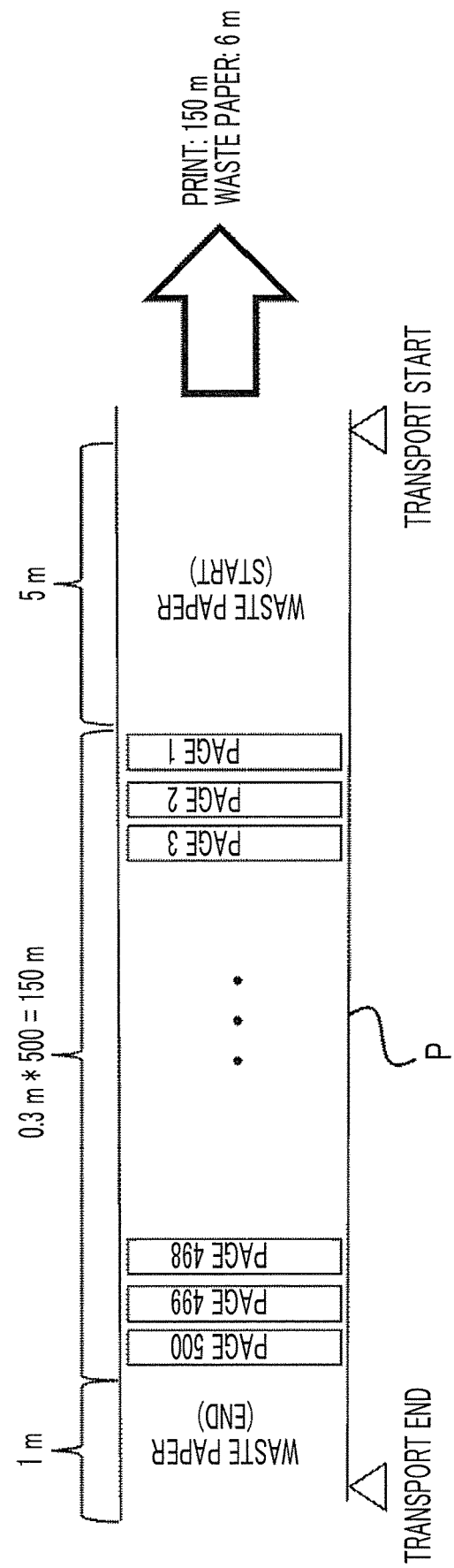
FIG. 11 is a diagram providing explanation of the waste paper aggregating process performed in a case where printing is normally performed without an error.

FIG. 11 is a diagram providing explanation of the waste paper aggregating process in a case where the printing is normally performed without an error.

The example of FIG. 11 illustrates a case where the job of 500 pages is normally printed without the error. In this case, for example, it is derived that the printing length used to print the job is 150 m, the waste paper length before the printing starts is 5 m, and the waste paper length after the printing ends is 1 m. Therefore, the waste paper length is aggregated as 6 m.

Figure 12:
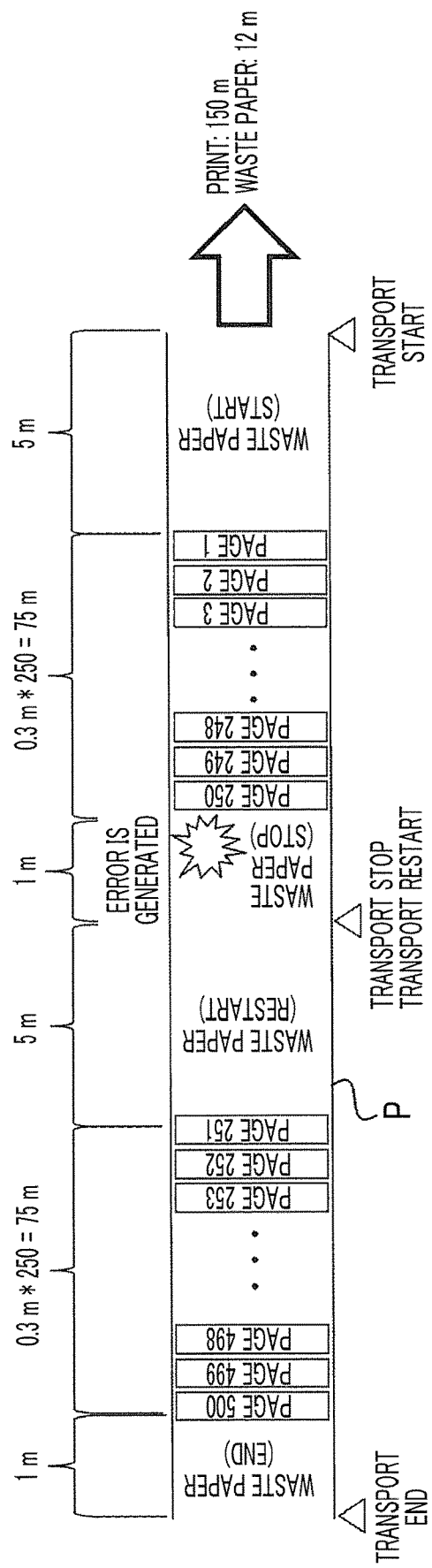
FIG. 12 is a diagram providing explanation of the waste paper aggregating process performed in a case where the printing restarts from an error generated page.

FIG. 12 is a diagram providing explanation of the waste paper aggregating process in a case where the printing restarts from the error generated page.

The example of FIG. 12 illustrates a case where an error occurs on a 251-th page while the job of the 500 pages is processed and the printing restarts from the 251-th page on which the error occurs. In this case, for example, it is derived that the printing length used to print the job is 150 m, the waste paper length before the printing starts is 5 m, the waste paper length until the transport stops after the printing stops due to the occurrence of the error is 1 m, the waste paper length until the printing restarts after the transport restarts due to the occurrence of the error is 5 m, and the waste paper length after the printing ends is 1 m. Therefore, the waste paper length is aggregated as 12 m.

Figure 13:
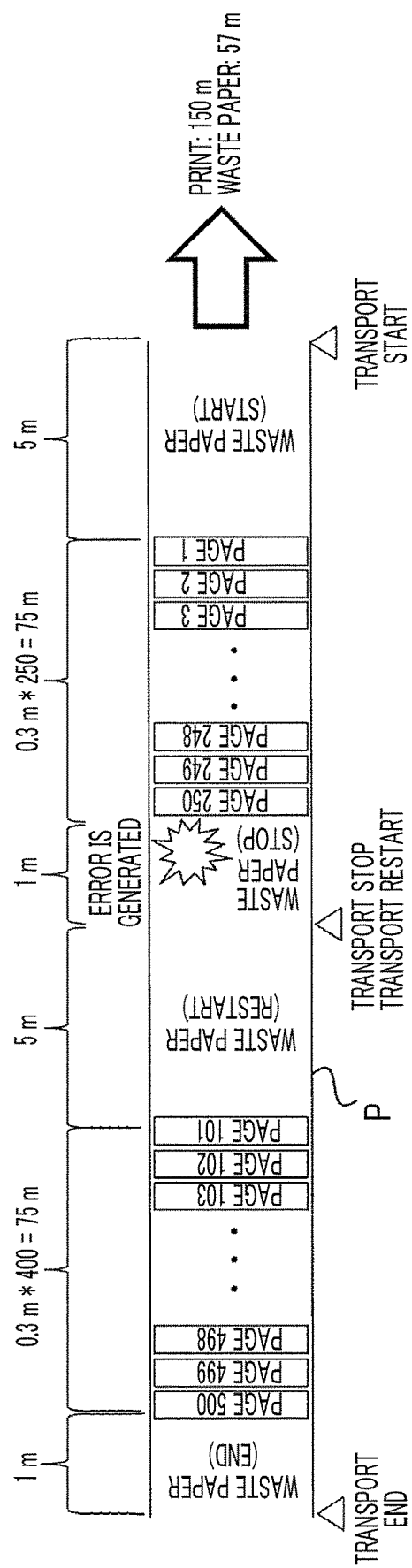
FIG. 13 is a diagram providing explanation of the waste paper aggregating process performed in a case where the printing restarts from a page preceding the error generated page.

FIG. 13 is a diagram providing explanation of the waste paper aggregating process performed in a case where the printing restarts from the page preceding the error generated page.

The example of FIG. 13 illustrates a case where the printing restarts from a 101-th page preceding the 251-th page on which the error occurs although the error occurs on the 251-th page during processing the job of 500 pages. In this case, for example, although an actual printing length used to print the job is 120 m+75 m=195 m, 150 pages (150 page×0.3 m=45 m) from the 101-th page to a 250-th page, which are duplicately printed, are counted as the waste paper. Therefore, the waste paper length is counted as 12 m+45 m=57 m.

Subsequently, an operation of the printing management apparatus 10 according to the second exemplary embodiment will be described with reference to FIG. 14.

Figure 14:
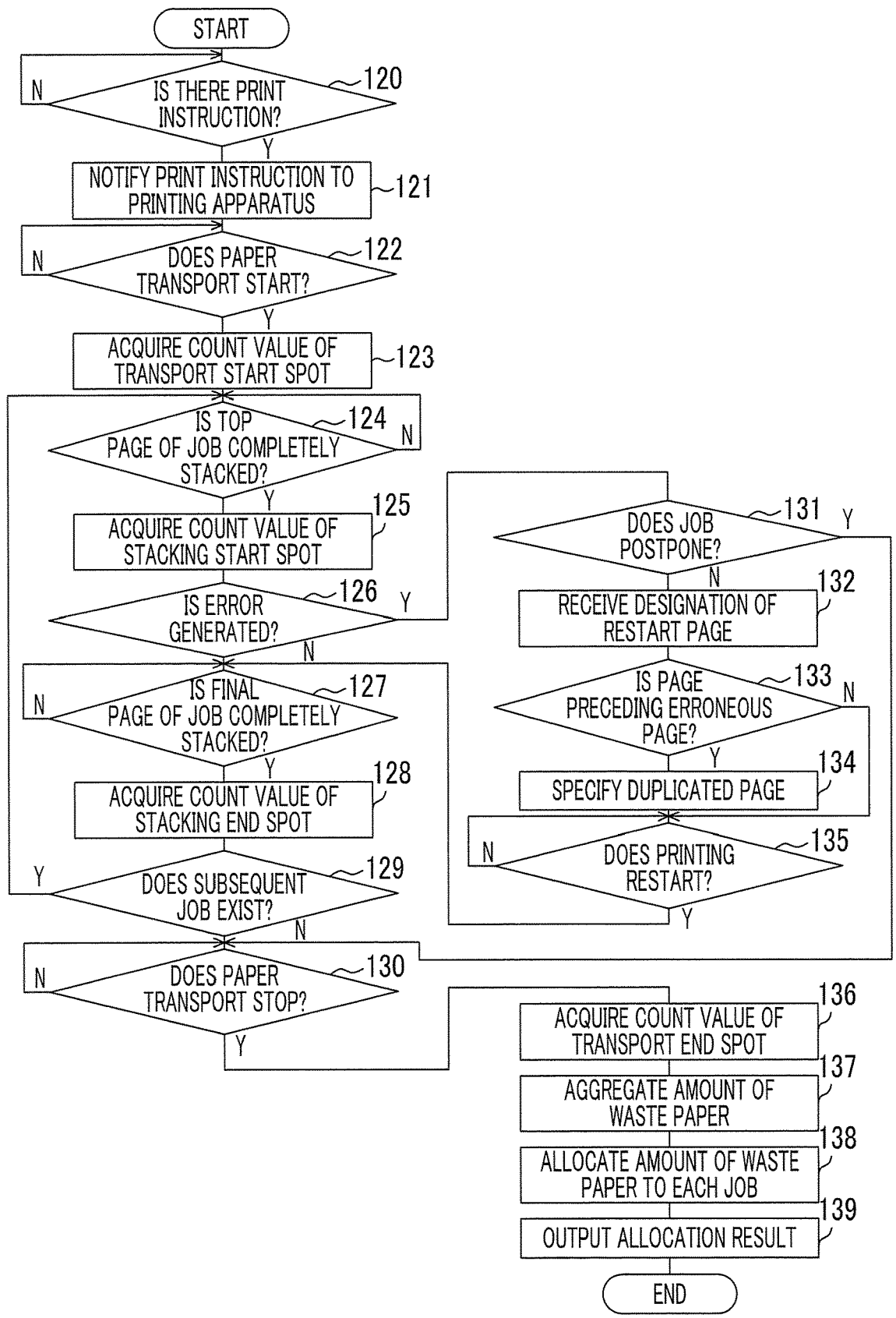
FIG. 14 is a flowchart illustrating an example of a flow of a process performed by a printing management program according to the second exemplary embodiment.

FIG. 14 is a flowchart illustrating an example of a flow of a process performed by the printing management program 12A according to the second exemplary embodiment.

First, in a case where the power of the printing management apparatus 10 is turned on and the printing management apparatus 10 is driven, the printing management program 12A is driven, and the following respective steps are performed. In the exemplary embodiment, as an example, the continuous form paper P illustrated in FIG. 9 will be described as a target.

In step 120 of FIG. 14, the CPU 11A determines whether or not the print instruction to the printing apparatus 50 exists according to the operation of the user. In a case where it is determined that the print instruction exists (in a case of positive determination), the process proceeds to step 121. In a case where it is determined that the print instruction does not exist (in a case of negative determination), the process stands by in step 120.

In step 121, the CPU 11A notifies the print instruction to the printing apparatus 50, and starts to monitor the printing apparatus 50.

In step 122, the CPU 11A determines whether or not the transport of the continuous form paper P starts in the printing apparatus 50. In a case where it is determined that the transport of the continuous form paper P starts (in a case of positive determination), the process proceeds to step 123. In a case where it is determined that the transport of the continuous form paper P does not start (in a case of negative determination), the process stands by in step 122.

In step 123, the CPU 11A acquires the count value of the transport start spot of the continuous form paper P from the printing apparatus 50, and stores the acquired count value in the storage unit 12.

In step 124, the CPU 11A determines whether or not the leading page of the job A is completely stacked. In a case where it is determined that the leading page is completely stacked (in a case of positive determination), the process proceeds to step 125. In a case where it is determined that the leading page is not completely stacked (in a case of negative determination), the process stands by in step 124.

In step 125, the CPU 11A acquires the count value of the stacking start spot of the job A from the printing apparatus 50, and stores the acquired count value in the storage unit 12.

In step 126, the CPU 11A determines whether or not an error occurs in the printing apparatus 50. In a case where it is determined that no error occurs (in a case of negative determination), the process proceeds to step 127. In a case where it is determined that the error occurs (in a case of positive determination), the process proceeds to step 131.

In step 127, the CPU 11A determines whether or not the final page of the job A is completely stacked. In a case where it is determined that the final page of the job A is completely stacked (in a case of positive determination), the process proceeds to step 128. In a case where it is determined that the final page of the job A is not completely stacked (in a case of negative determination), the process stands by in step 127.

In step 128, the CPU 11A acquires the count value of the stacking end spot of the job A from the printing apparatus 50, and stores the acquired count value in the storage unit 12.

In step 129, the CPU 11A determines whether or not the subsequent job exists. In a case where it is determined that the subsequent job exists (in a case of positive determination), the process returns to step 124 and the processes are repeated. In a case where it is determined that the subsequent job does not exist (in a case of negative determination), the process proceeds to step 130. In the above-described example of FIG. 9, since the job B and the job C exist as the subsequent jobs, the positive determination is performed, and thus the processes in steps 124 to 129 are performed for the job B and the job C.

In step 130, the CPU 11A determines whether or not the transport of the continuous form paper P stops. In a case where it is determined that the transport of the continuous form paper P stops (in a case of positive determination), the process proceeds to step 136. In a case where it is determined that the transport of the continuous form paper P does not stop (in a case of negative determination), the process stands by in step 130.

Figure 15:
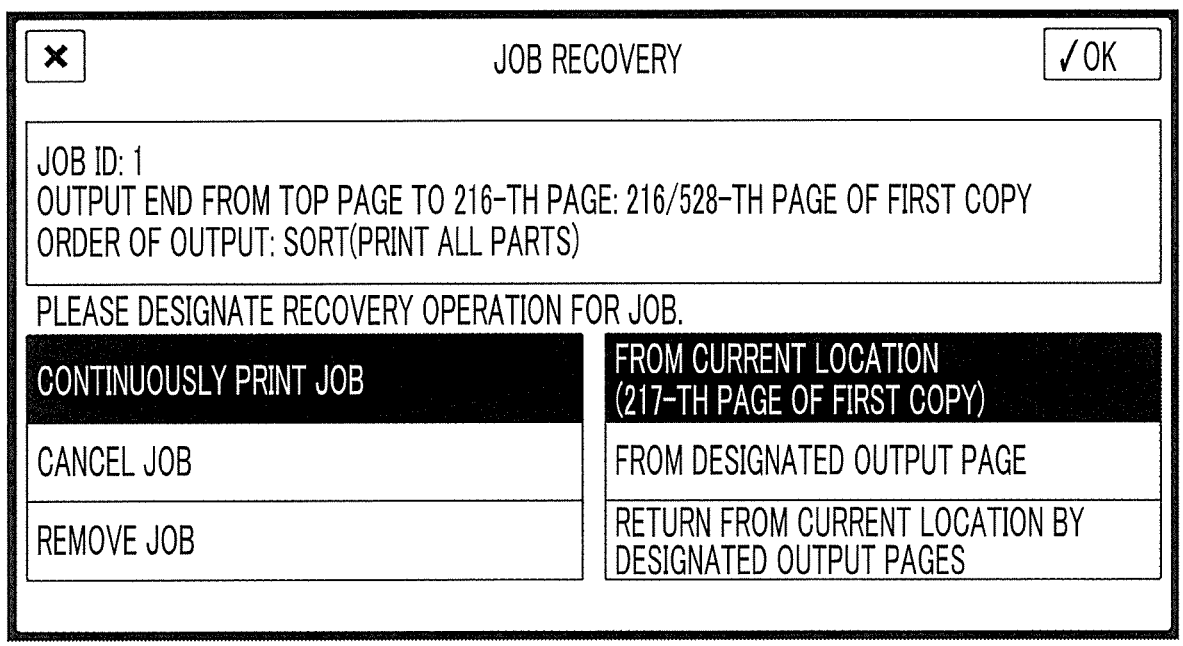
FIG. 15 is a front diagram illustrating an example of a pop-up screen according to the exemplary embodiment.

In contrast, in step 131, as an example, the CPU 11A displays a pop-up screen illustrated in FIG. 15 and determines whether or not to postpone the job. In a case where it is determined to not postpone the job, that is, to perform a recovery of the printing (in a case of negative determination), the process proceeds to step 132, and the job is postponed. That is, in a case where it is determined to not perform the recovery of the printing (in a case of positive determination), the process proceeds to step 130.

FIG. 15 is a front diagram illustrating an example of the pop-up screen according to the exemplary embodiment.

The pop-up screen illustrated in FIG. 15 is a screen which is popped up and displayed in a case where the error occurs. In the pop-up screen, as an example, it is possible to designate "continuously print job", "cancel job", and "remove job". Furthermore, in a case where the "continuously print job" is designated, it is possible to designate, as an example, "from current location (217-th page of first copy)", "from designated output page", and "return from current location by designated output pages".

In step 132, as an example, the CPU 11A receives designation of the restart page from the pop-up screen illustrated in FIG. 15.

In step 133, the CPU 11A determines whether or not the restart page designated in step 132 is a page preceding an erroneous page. In a case where it is determined that the restart page is the page preceding the erroneous page (in a case of positive determination), the process proceeds to step 134. In a case where it is determined that the restart page is not the page preceding the erroneous page, that is, the restart page is the erroneous page (in a case of negative determination), the process proceeds to step 135.

In step 134, the CPU 11A specifies a duplicated page on which the printing is duplicated due to the recovery.

In step 135, the CPU 11A determines whether or not to restart the printing. In a case where it is determined to restart the printing (in a case of positive determination), the process proceeds to step 127. In a case where it is determined to not restart the printing (in a case of negative determination), the process stands by in step 135.

In step 136, the CPU 11A acquires the count value of the spot, at which the transport of the continuous form paper P ends, from the printing apparatus 50, and stores the acquired count value in the storage unit 12.

In step 137, the CPU 11A aggregates the amount of waste paper based on each count value stored in the storage unit 12. Specifically, as described above, in a case where the printing restarts from the erroneous page, the length, which is acquired by subtracting the length used to print the jobs A to C from the length determined by the transport start spot and the transport end spot, is aggregated as the amount of waste paper. In addition, in a case where the printing restarts from the page preceding the erroneous page, a length, which is acquired by adding the length of the part duplicately printed due to the occurrence of the error to a length acquired by subtracting the length of the part used to print the plurality of jobs from the length determined by the transport start spot and the transport end spot, is aggregated as the amount of waste paper.

In step 138, the CPU 11A allocates the amount of waste paper aggregated in step 137 to each job. Specifically, in a case where the printing restarts from the erroneous page, the waste paper generated due to the occurrence of the error is allocated to the job B at which the error occurs, that is, the waste paper before the printing starts and the waste paper after the printing ends are allocated according to the length of the part used to print each of the jobs A to C. In addition, in a case where the printing restarts from the page preceding the erroneous page, the waste paper generated due to the occurrence of the error and the waste paper duplicately printed due to the occurrence of the error are allocated to the job B at which the error occurs, that is, the waste paper before the printing starts and the waste paper after the printing ends are allocated according to the length of the part used to print each of the jobs A to C.

In step 139, the CPU 11A outputs allocation results, allocated in step 138, to the display unit 13, and ends a series of processes performed by the printing management program 12A.

Figure 16:
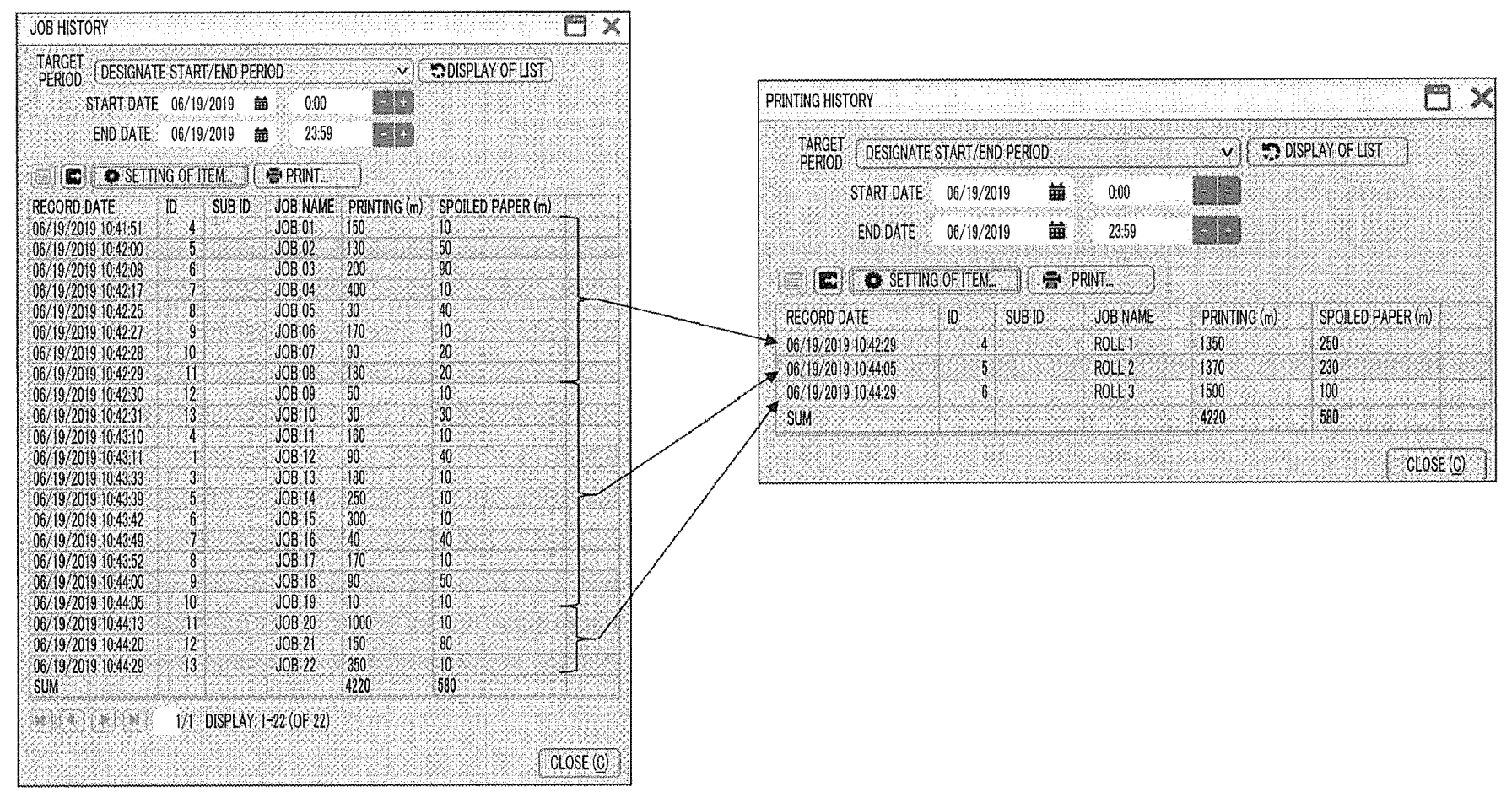

FIG. 16 is a front diagram illustrating examples of the job history screen and a printing history screen according to the exemplary embodiment.

In the job history screen illustrated in FIG. 16, the spoiled paper (waste paper) is managed in job units. In the printing management apparatus 10, the jobs may be collectively managed in rolled paper (continuous form paper) units. Specifically, in the printing history screen illustrated in FIG. 16, for each rolled paper, the sum of spoiled paper lengths of the plurality of respective jobs included in the rolled paper and the sum of the printing lengths of the plurality of respective jobs are illustrated as printing information in rolled paper units.

Figure 17:
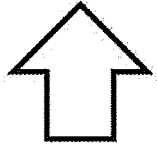
FIG. 17 is a front diagram illustrating an example of the job history screen and a cost aggregation (paper) screen according to the exemplary embodiment.

FIG. 17 is a front diagram illustrating examples of the job history screen and a cost aggregation (paper) screen according to the exemplary embodiment.

In the job history screen illustrated in FIG. 17, the spoiled paper (waste paper) is managed in job units, in the same manner as in the example of FIG. 16. In the printing management apparatus 10, management may be performed by converting the cost of the paper used for the printing into price for each job. Specifically, the cost aggregation (paper) screen illustrated in FIG. 17 shows, as an example, a case of using a rolled paper (continuous form paper) of 100 yen per 1 m.

Hereinabove, the printing management apparatus according to the exemplary embodiment is described as an example. The exemplary embodiment may have a form of a program for causing a computer to perform functions of the respective units included in the printing management apparatus. The exemplary embodiment may have a form of a computer-readable storage medium which stores the program.

In addition, the configuration of the printing management apparatus described in the exemplary embodiment is an example, and may be changed according to a situation in a scope without departing from a gist.

In addition, the flow of the process of the program described in the exemplary embodiment is an example. Unnecessary steps may be removed, new steps may be added, and a processing sequence may be replaced in the scope without departing from the gist.

In addition, in the exemplary embodiment, a case is described where, in a case where the program is executed, the process according to the exemplary embodiment is realized using a computer through a software configuration. However, the exemplary embodiment is not limited thereto. The exemplary embodiment may be realized through, for example, a hardware configuration and a combination of the hardware configuration and the software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing management apparatus comprising:
   a memory;
   a display that is connected to the memory; and
   a processor that is connected to the memory and the display,
   wherein, in a case where a printing apparatus, which performs printing on continuous form paper, processes a plurality of jobs with respect to the continuous form paper in one-time printing, the processor calculates a length, which is acquired by excluding a part used to print the plurality of jobs from a length determined by a transport start spot at which transport of the continuous form paper starts and a transport end spot at which the transport of the continuous form paper ends, as an amount of waste paper indicative of a part which becomes a loss of the continuous form paper, and
   outputs an amount of waste paper for each job of the plurality of jobs, which is acquired by allocating the calculated amount of waste paper to the plurality of jobs respectively, to the display, and
   the display displays the amount of waste paper for the respective jobs of the plurality of jobs based on an input from the processor,
   wherein the waste paper includes a part between the transport start spot and a spot at which the printing of a leading page of an initial job of the plurality of jobs starts, and a part between a spot at which a final page of a last job of the plurality of jobs ends and the transport end snot.

2. The printing management apparatus according to claim 1,
   wherein, in a case where the printing apparatus processes a plurality of subsequent jobs continuing the plurality of jobs with respect to the continuous form paper in one-time printing, the processor calculates a length, which is acquired by excluding a part used to print the plurality of subsequent jobs from a length determined by a subsequent transport start spot corresponding to the same spot as the transport end spot and a subsequent transport end spot, as an amount of subsequent waste paper, and
   outputs an amount of subsequent waste paper for each subsequent job, which is acquired by allocating the calculated amount of subsequent waste paper to each of the plurality of subsequent jobs.

3. The printing management apparatus according to claim 2,
   wherein the subsequent waste paper includes
   a part between the subsequent transport start spot and a spot at which the printing of a leading page of an initial job of the plurality of subsequent jobs starts, and
   a part between a spot, at which the printing of a final page of a last job of the plurality of subsequent jobs ends, and the subsequent transport end spot.

4. The printing management apparatus according to claim 3,
   wherein the processor allocates the calculated amount of waste paper according to the number of pages of each of the plurality of jobs.

5. The printing management apparatus according to claim 2,
wherein the processor allocates the calculated amount of waste paper according to the number of pages of each of the plurality of jobs.

6. The printing management apparatus according to claim 2,
wherein the processor changes a method for allocating the calculated amount of waste paper between a case where an error occurs during the printing of the plurality of jobs and a case where no error occurs during the printing of the plurality of jobs.

7. The printing management apparatus according to claim 1,
wherein, in a case where the printing restarts from a page, on which an error occurs, after once stopping the printing of the plurality of jobs according to the error generated during the printing of the plurality of jobs, the processor calculates a length, which is acquired by excluding the part used to print the plurality of jobs from a length determined by the transport start spot of the continuous form paper before the error occurs and the transport end spot of the continuous form paper after the printing restarts, as an amount of the waste paper.

8. The printing management apparatus according to claim 7,
wherein the waste paper further includes
a part between a spot, at which the printing of a page immediately before the error occurs stops, and a transport stop spot corresponding to a spot at which the transport of the continuous form paper stops due to an occurrence of the error, and
a part between a transport restart spot corresponding to the same spot as the transport stop spot and a spot at which the printing restarts with respect to the continuous form paper.

9. The printing management apparatus according to claim 8,
wherein the processor allocates the calculated amount of waste paper according to the number of pages of each of the plurality of jobs.

10. The printing management apparatus according to claim 7,
wherein the processor allocates the calculated amount of waste paper according to the number of pages of each of the plurality of jobs.

11. The printing management apparatus according to claim 1,
wherein, in a case where the printing restarts from a page preceding a page, on which an error occurs, after once stopping the printing of the plurality of jobs according to the error which occurs during the printing of the plurality of jobs, the processor calculates a length, which is acquired by adding a length of a part duplicately printed due to the occurrence of the error to a length acquired by excluding the part used to print the plurality of jobs from a length determined by the transport start spot of the continuous form paper before the error occurs and the transport end spot of the continuous form paper after the printing restarts, as an amount of the waste paper.

12. The printing management apparatus according to claim 11,
wherein the waste paper further includes
a part between a spot, at which the printing of a page immediately before the error occurs stops, and a transport stop spot corresponding to a spot at which the transport of the continuous form paper stops due to the occurrence of the error,
a part between a transport restart spot corresponding to the same spot as the transport stop spot and a spot at which the printing restarts with respect to the continuous form paper, and
the part duplicately printed due to the occurrence of the error.

13. The printing management apparatus according to claim 12,
wherein the processor allocates the calculated amount of waste paper according to the number of pages of each of the plurality of jobs.

14. The printing management apparatus according to claim 11,
wherein the processor allocates the calculated amount of waste paper according to the number of pages of each of the plurality of jobs.

15. The printing management apparatus according to claim 1,
wherein the processor allocates the calculated amount of waste paper according to the number of pages of each of the plurality of jobs.

16. The printing management apparatus according to claim 1,
wherein the processor changes a method for allocating the calculated amount of waste paper between a case where an error occurs during the printing of the plurality of jobs and a case where no error occurs during the printing of the plurality of jobs.

17. The printing management apparatus according to claim 16,
wherein, in a case where no error occurs during the printing of the plurality of jobs, the processor allocates the calculated amount of waste paper according to a length of the part used to print each of the plurality of jobs, and
in a case where an error occurs during the printing of the plurality of jobs, the processor allocates the amount of waste paper generated due to an occurrence of the error to a job in which the error occurs, and allocates the amount of waste paper, which includes the part between the transport start spot and the spot at which the printing of the leading page of the initial job of the plurality of jobs starts and the part between a spot at which the final page of the last job of the plurality of jobs ends and the transport end spot, according to a length of the part used to print each of the plurality of jobs.

* * * * *